United States Patent [19]

Kmiec

[11] Patent Number: 5,139,694
[45] Date of Patent: Aug. 18, 1992

[54] CLEANING COMPOSITION FOR RESIN PROCESSING EQUIPMENT

[75] Inventor: Chester J. Kmiec, Phillipsburg, N.J.

[73] Assignee: Union Carbide Chemicals & Plastics Technology Corporation, Danbury, Conn.

[21] Appl. No.: 697,013

[22] Filed: May 8, 1991

[51] Int. Cl.$^5$ .................. C11D 3/37; C11D 3/32; C11D 3/08
[52] U.S. Cl. .................. 252/174.23; 252/154; 252/155; 252/165
[58] Field of Search .................. 252/174.23, 154, 155, 252/165

[56] References Cited

U.S. PATENT DOCUMENTS

| | | | |
|---|---|---|---|
| 4,095,985 | 10/1976 | Brown | 252/174.23 |
| 4,838,945 | 2/1987 | Fuji et al. | 252/174.23 |
| 4,838,948 | 7/1987 | Bailey | 252/174.23 |

FOREIGN PATENT DOCUMENTS

| | | | |
|---|---|---|---|
| 234529 | 1/1987 | European Pat. Off. | 252/174.23 |
| 2061827 | 6/1972 | Fed. Rep. of Germany | 252/174.23 |
| 59-124999 | 1/1983 | Japan | 252/174.23 |

*Primary Examiner*—Paul Lieberman
*Assistant Examiner*—Kery A. Fries
*Attorney, Agent, or Firm*—Saul R. Bresch

[57] ABSTRACT

A composition comprising a mixture of:
(i) polyethylene;
(ii) aluminum silicate;
(iii) sodium-potassium-aluminum silicate
(iv) calcium metasilicate;
(v) one or more fatty acid amides; and
(vi) a mixture of fatty acid mono-and diglycerides.

9 Claims, No Drawings

CLEANING COMPOSITION FOR RESIN PROCESSING EQUIPMENT

TECHNICAL FIELD

This invention relates to a composition useful in removing residual materials from the equipment in which thermoplastic resin is converted to a finished product.

BACKGROUND INFORMATION.

Resin processing equipment such as extruders and those used for injection molding is generally run for long periods of time. During these periods, residual materials can build up on various parts of the equipment such as the screw, barrel, or die. This material buildup can result from the carbonization or decomposition of resin or plastic product due to high processing temperatures or from the adherence of some of the resin or plastic product to the equipment surfaces for much the same reason. Cleaning is periodically required to remove these materials from the equipment in order to prevent contamination of the finished product.

In addition to the problem raised by carbonized and decomposed material, a problem is raised by the fact that extrusion and/or injection molding equipment is seldom utilized exclusively for one specific resin. Rather, it is used to process a variety of polymers. It is, therefore, imperative to flush or purge the resin presently being processed before a different polymer is introduced into the extruder, injection molding apparatus, or other equipment of a similar nature.

Typical cleaning methods include disassembly to get at the screw, die, or other parts, followed by physical removal of the objectionable material, which has adhered to the metal surfaces. These methods are time consuming and expensive, and require reheating of the equipment for the next run after it is reassembled. Another typical cleaning method is to purge the residual material with large quantities of the resin to be processed in the next run. This technique is, again, time consuming and expensive. Further, it does not insure that all of the carbonized and/or decomposed or other material is removed from the metal surfaces.

Acrylic resins have been used as purge materials; however, their use requires relatively higher processing temperatures due to their relatively high melting points. This not only increases energy consumption, but also the tendency for the material to be cleaned out to carbonize or decompose due to the increased heat. Subsequent removal of the acrylic resin is difficult especially when the machine temperature has to be lowered for the next material to be processed. Contamination and/or clogging of the screen pack or breaker plate by unmelted acrylic resin is likely under these circumstances.

Fillers such as talc, calcium carbonate, or mica have been added to polymer based purge compositions. These fillers, however, have relatively low Mohs hardness values in the 1 to 2 range. These low values do not provide good scouring action because the soft particles have a tendency to crush or break apart when pushed against the walls of an extruder or molding barrel. A Mohs hardness of 3 or more would be advantageous.

DISCLOSURE OF THE INVENTION

An object of this invention is to provide an effective composition for thermoplastic resin processing equipment, which both cleans the surface of the equipment and purges unwanted resin from the system.

Other objects and advantages will become apparent hereinafter.

According to the present invention, the above object is met by a composition comprising a mixture of:
(i) polyethylene;
(ii) aluminum silicate;
(iii) sodium-potassium-aluminum silicate;
(iv) calcium metasilicate;
(v) one or more fatty acid amides; and
(vi) a mixture of fatty acid monoglycerides and diglycerides.

The polyethylene can be any one of a number of thermoplastic resins, which are homopolymers of ethylene or copolymers of ethylene and one or more alpha-olefins having 3 to 12 carbon atoms. Examples of the alpha-olefins are propylene, 1-butene, 1-hexene, 4-methyl-1-pentene, and 1-octene. The density can be in the range of about 0.880 to about 0.965 gram per cubic centimeter and the melt index can be in the range of about 0.01 to about 20 grams per 10 minutes. The polyethylene can be prepared by conventional low pressure or high pressure processes in solution, slurry, or gas phase. See, for example, Introduction To Polymer Chemistry, Stille, Wiley and Sons, New York, 1962, pages 149 to 153; U.S. Pat. No. 4,101,445; and European Patent Application 120,501.

Aluminum silicate can be described as a naturally occurring substance that typically contains approximately 76% $SiO_2$, 14% $Al_2O_3$, 4.6% $K_2$, 2.9% $Na_2O$, plus trace components of less than 1% The particle shapes are hard, rigid, and irregular. The specific gravity is 2.16 grams per cubic centimeter. The particle size is 100% minus U.S. Standard 325 mesh. Mo's hardness values are greater than 5.5.

Calcium metasilicate can be described as follows: Wollastonite, also known as Ca silicate or Ca metasilicate, is a naturally occurring substance. Ca metasilicate has a theoretical composition of 48.3% CaO and 51.7% $SiO_2$. Typically, the filler contains 47% CaO, 50% $SiO_2$, and 1% $Al_2O_3$ plus trace components of less than 1%. The substance has an acicular particle shape with a specific gravity of 2.9 grams per cubic centimeter and a Moh's hardness value of 4.5. The surface area of the particle is typically 1.9 square meters per gram.

Sodium-Potassium-Aluminum Silicate can be described as a naturally occurring substance that typically contains the following components: 61% $SiO_2$, 23.3% $Al_2O_3$, 9.8% $Na_2O$, plus trace components of less than 1%. The substance has an essentially nodular particle shape, but each particle exhibits a series of serrated edges often in parallel configuration. The specific gravity of the substance is 2.61 grams per cubic centimeter with a Moh's hardness of 5.5 to 6.0. The surface area of the particle is typically between 0.5 and 2.7 square meters per gram. The particle size can range up to 105 microns with a mean particle size of 16 microns.

The fatty acid amides are those having 8 to 22 carbon atoms in the fatty acid moiety. They can be saturated or unsaturated. A preferred fatty acid primary amide is stearamide, i.e., $CH_3(CH_2)_{16}CONH_2$. Examples of other suitable fatty acid primary amides are oleamide, erucamide, and behenamide. Examples of fatty acid bisamides are ethylene distearamide and ethylene dioleamide. Examples of fatty acid secondary amides, which are characterized by two long oleophilic chains, are stearyl erucamide, erucyl erucamide, stearyl stearamide, erucyl stearamide, and oleyl palmitamide. Other examples of secondary amides can be found in U.S. Pat. No. 3,597,382.

A monoglyceride is a glycerol ester of a fatty acid in which only one acid group is attached to the glycerol group. A typical formula is:

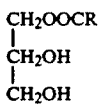

wherein R has 12 to 22 carbon atoms.

A diglyceride is a glycerol ester of a fatty acid in which two acid groups are attached to the glycerol group. A typical formula is:

wherein R has 12 to 22 carbon atoms and each R can be the same or different.

The components of subject composition can be present in about the following proportions:

| Component | Percent by Weight | |
|---|---|---|
| | Broad Range | Preferred Range |
| Polyethylene | 20 to 80 | 50 to 75 |
| Aluminum silicate | 10 to 30 | 10 to 20 |
| Na—K—Al silicate | 4 to 20 | 5 to 10 |
| Calcium metasilicate | 4 to 20 | 5 to 10 |
| Fatty acid amides | 1 to 5 | 3 to 5 |
| Mixture of fatty acid mono-and diglycerides | 1 to 5 | 2 to 5 |

Weight ratios of various components are about as follows:

| Component | Broad Range | Preferred Range |
|---|---|---|
| Monoglycerides to Diglycerides | 0.4:1 to 99:1 | 0.66:1 to 99:1 |
| Al silicate to Na—K—Al silicate | 1:1 to 7.5:1 | 2:1 to 4:1 |
| Al silicate to Ca metasilicate | 1:1 to 7.5:1 | 2:1 to 4:1 |
| Na—K—Al silicate to Ca metasilicate | 0.2:1 to 5:1 | 0.5:1 to 2:1 |

Examples of processing equipment in which subject cleaning composition can be used are, as mentioned above, extruders and injection molding apparatus. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression or transition section, and the metering section, and two zones, the back heat zone and the front heat zone, the sections and zones running from upstream to downstream. If it has more than one barrel, the barrels are connected in series. The length to diameter ratio of each barrel is in the range of about 16:1 to about 30:1. For more information on extruders, see U.S. Pat. No. 4,444,948.

A description of typical injection molding apparatus can be found in the Injection Molding Handbook, edited by Rosato et al, Van Nostrand, N.Y., 1986, pages 10 and 11, and Injection Molding, Rubin, John Wiley & Sons, New York, 1972, pages 5 and 6. Typical conditions are described in U.S. Pat. No. 4,390,677.

Advantages of the invention are (i) efficient cleaning and scouring actions for removal of carbonized and/or decomposed material, and plastic, from resin processing equipment; (ii) the cleaning composition per se does not stick to the parts of the equipment such as the machine screw or the inside wall of the barrel, thus allowing easy disassembly of the equipment; and (iii) the resulting metal surfaces are shiny.

Publications, patents, and patent applications mentioned in this specification are incorporated by reference herein.

The invention is illustrated by the following examples.

EXAMPLE 1

Black high density polyethylene (HDPE) pellets having a density of 0.956 gram per cubic centimeter and a melt index of 0.1 gram per 10 minutes are extruded using a 2.5 inch extruder equipped with a single stage mixing screw, a 20-60-20 screen pack, a breaker plate, and a rod die. The black HDPE is extruded at 27 revolutions per minute (rpm) for ten minutes at a temperature of 400° F. After 10 minutes, the rpm is increased to 50 for a period of 5 minutes. This procedure permits the HDPE to completely coat the screw, barrel, and inside of the die. The extruder is then allowed to run dry. When no additional material is observed exiting the die, the machine and heat are shut off. Subsequent immediate removal of the screw is difficult requiring a hydraulic ram. Examination of the screw and barrel reveals that the black HDPE is left in all flights of the screw and is coated on the inside of the extruder barrel. This experiment indicates that the black HDPE material would be difficult to purge from the extruder.

EXAMPLE 2

The following cleaning composition is prepared via a Banbury ™ mixer and pelletized into one eighth inch pellets:

| | Wt. % |
|---|---|
| Low density polyethylene (LDPE) | 67.98 |
| Al silicate | 11.5 |
| Ca metasilicate | 5.75 |
| Na—K—Al silicate | 5.75 |
| Stearamide | 4 |
| Mono/diglyceride mixture | 5 |
| Antioxidant I | 0.02 |
| Total | 100.00 |

Following the procedure in example 1, black HDPE is run in a 2.5 inch extruder. 24 pounds of the cleaning composition are added to the extruder after it is run dry, i.e., no additional black HDPE material is observed exiting the die. At this time, the barrel temperature is reduced to 270° F. and the extruder rpm is set at 27. The extruder is then run for 10 minutes after which the rpm is increased to 50, and the extruder is permitted to run dry. The machine and heat are then turned off. The die, breaker plate, and screw are easily removed. No hydraulic ram is required to remove the screw. It is easily pushed out by hand. No cleaning composition or black HDPE is observed to be left in the screw flights or on the inside of the barrel. The metal extruder surfaces are extremely shiny and polished. Residual cleaning composition is easily removed from the breaker plate. The cleaning compound exhibited no stickiness with respect to the metal surfaces. It is noted that each of the silicates has a Mohs hardness of at least 3. The LDPE utilized has a density of 0.918 gram per cubic centimeter and a melt index of 2.0 grams per 10 minutes.

EXAMPLES 3 AND 4

The following compositions are prepared and evaluated as cleaning compositions.

| Components | Wt. % Examples | |
|---|---|---|
| | 3 | 4 |
| LDPE | 62.9 | 69.9 |
| Al silicate | 30 | 0 |
| Ca metasilicate | 0 | 23 |
| Stearamide | 4 | 4 |
| mono/diglyceride mixture | 3 | 3 |
| antioxidant I | 0.05 | 0.05 |
| antioxidant II | 0.05 | 0.05 |
| Total | 100.00 | 100.00 |

Following the procedure of Example 2, 24 pounds of each of the above cleaning compositions are evaluated. In each example the removal of the screw is extremely difficult. Residual cleaning composition is observed in the screw flights as well as on the interior wall of the barrel. Six flights of the screw are full of the cleaning composition; the cleaning composition sticks to the metal surface of the breaker plate; the overall finish of the metal surfaces is dull, not shiny; residual black HDPE is also observed on the screw, the inner wall of the barrel, and the breaker plate.

EXAMPLES 5 AND 6

Following the same procedure as set forth in Example 2, 24 pounds of the following cleaning composition are evaluated:

| Components | Wt. % Examples | |
|---|---|---|
| | 5 | 6 |
| LDPE | 79.9 | 79.98 |
| Diatomaceous earth | 13 | 0 |
| Talc | 0 | 13 |
| Stearamide | 4 | 4 |
| mono/diglyceride mixture | 3 | 3 |
| antioxidant I | 0.1 | 0.02 |
| Total | 100.00 | 100.00 |

Upon shutdown and subsequent inspection of the extruder, the screw in Example 5 is difficult to remove; a significant amount of residual black HDPE is observed on both the screw surface as well as the inner wall of the barrel; the metal surfaces have a dull finish; cleaning composition fills the flights in both the transition and metering sections of the extruder screw; and the cleaning composition is found to be sticky when removed from the breaker plate.

With respect to Example 6, a hydraulic ram is required to move the extruder screw; all flights of the screw are found to be full of cleaning composition and residual black HDPE; the inside surface of the barrel is coated with cleaning composition; the cleaning composition is found to be extremely sticky and is not easily removed from the screw; black HDPE is found coated on the screw under the cleaning composition as well as on the inner surface of the barrel; the breaker plate is found to be completely full of both cleaning composition and residual black HDPE, which could not be easily removed; after removal of material, the surfaces have a dull finish.

EXAMPLES 7 AND 8

| Components | Wt. % Examples | |
|---|---|---|
| | 7 | 8 |
| LDPE | 62.9 | 62.9 |
| Al silicate | 20 | 20 |
| Na—K—Al silicate | 10 | 0 |
| Ca metasilicate | 0 | 10 |
| Stearamide | 4 | 4 |
| Mono/diglyceride mixture | 3 | 3 |
| Antioxidant I | 0.05 | 0.05 |
| Antioxidant II | 0.05 | 0.05 |
| Total | 100.00 | 100.00 |

Upon shutdown and subsequent inspection of the extruder, the cleaning composition of Example 7 does not allow removal of the extruder screw; all screw flights are full of cleaning composition; the cleaning composition is extremely sticky; significant smoking out of the die is observed; and a significant amount of black HDPE remains in the extruder.

The results obtained from the cleaning composition of Example 8 are similar to the results obtained with Example 7. All screw flights are full of cleaning composition; black HDPE remains in the extruder; and the cleaning composition is extremely sticky and cannot easily be removed from the screw pack or breaker plate.

EXAMPLES 9 TO 12

| Components | Wt. % Examples | | | |
|---|---|---|---|---|
| | 9 | 10 | 11 | 12 |
| LDPE | 79.98 | 79.98 | 62.9 | 71.9 |
| Al silicate | 6.5 | 7.8 | 18 | 13 |
| Ca metasilicate | 3.25 | 2.6 | 6 | 5 |
| Na—K—Al silicate | 3.25 | 2.6 | 6 | 5 |
| Stearamide | 4 | 4 | 4 | 3 |
| Mono/diglyceride mixture | 3 | 3 | 3 | 2 |
| Antioxidant I | 0.02 | 0.02 | 0.05 | 0.05 |
| Antioxidant II | 0 | 0 | 0.05 | 0.05 |
| Total | 100.00 | 100.00 | 100.00 | 100.00 |

Upon shutdown and subsequent inspection of the extruder, the compositions of Examples 9 and 10 do not appear to be as efficient cleaning compositions as the composition of Example 2. Removal of the extruder screw is difficult; a substantial amount of the cleaning composition is left in the screw flights located in the transition and metering sections; black HDPE is observed to remain on both the screw and the inner surface of the barrel; and the cleaning composition is slightly more tacky than the cleaning composition of Example 2. The cleaning composition, although slightly more tacky, is removed from the extruder screw.

On the other hand, the flights in the feed section are clean.

The compositions of Examples 11 and 12 leave some cleaning composition in the metering flights of the screw; the composition of Example 11 has five flights in the metering section full of material while Example 12 has six flights full of material; the material is easily removed from the surfaces in both examples as well as from the breaker plate. No tackiness is noted as in examples 9 and 10. The metal surfaces are shiny and clean; the compositions are effective in removing the black HDPE, i.e., no black HDPE is observed on the metal surfaces.

Notes to Examples

1. Antioxidant I is tetrakis [methylene (3,5-di-tert-butyl-4-hydroxyhydrocinnamate)] methane.
2. Antioxidant II is 2,4-bis (1,1-dimethylethyl) phenyl phosphite.
3. References to residual black HDPE and black HDPE are considered to include carbonized and decomposed HDPE resin, HDPE resin per se, the plastic product of the HDPE resin formed in the extruder, and carbonized and decomposed product.
4. The ratio of monoglycerides to diglycerides is 0.84:1 for example 2 and 0.87:1 for examples 3 to 12.
5. The density of the LDPE is 0.918 gram per cubic centimeter and the melt index is 2.0 grams per 10 minutes.

I claim:

1. A composition comprising a mixture of:
   (i) polyethylene;
   (ii) aluminum silicate;
   (iii) sodium-potassium-aluminum silicate;
   (iv) calcium metasilicate;
   (v) one or more fatty acid amides; and
   (vi) a mixture of fatty acid mono-and diglycerides
wherein the components are present in about the following amounts:

| Component | Percent by Weight |
| --- | --- |
| (i) | 20 to 80 |
| (ii) | 10 to 30 |
| (iii) | 4 to 20 |
| (iv) | 4 to 20 |
| (v) | 1 to 5 |
| (vi) | 1 to 5. |

2. The composition defined in claim 1 wherein the polyethylene is a homopolymer of ethylene or a copolymer of ethylene and one or more alpha-olefins having 3 to 12 carbon atoms.
3. The composition defined in claim 1 wherein the fatty acid moieties of said mono and diglycerides each contain from 12 to 22 carbon atoms.
4. The composition defined in claim 1 wherein the fatty acid moieties of said amides each contain from 8 to 22 carbon atoms.
5. The composition defined in claim 1 wherein the components are present in about the following amounts:

| Component | Percent by weight |
| --- | --- |
| (i) | 50 to 75 |
| (ii) | 10 to 20 |
| (iii) | 4 to 10 |
| (iv) | 4 to 10 |
| (v) | 2 to 5 |
| (vi) | 2 to 5 |

6. The composition defined in claim 1 wherein the weight ratios of various components are about as follows:

| Component | Ratio |
| --- | --- |
| (a) monoglycerides to diglycerides | 0.4:1 to 99:1 |
| (b) Al silicate to Na—K—Al silicate | 1:1 to 7.5:1 |
| (c) Al silicate to Ca metasilicate | 1:1 to 7.5:1 |
| (d) Na—K—Al silicate to Ca metasilicate | 0.2:1 to 5:1 |

7. The composition defined in claim 1 wherein the weight ratios of various components are about as follows:

| Component | Ratio |
| --- | --- |
| (a) monoglycerides to diglycerides | 0.66:1 to 99:1 |
| (b) Al silicate to Na—K—Al silicate | 1:1 to 4:1 |
| (c) Al silicate to Ca metasilicate | 1:1 to 4:1 |
| (d) Na—K—Al silicate to Ca metasilicate | 0.5:1 to 2:1 |

8. A process for cleaning resin processing equipment comprising passing through the equipment, after the resin is processed and the product removed, the cleaning composition defined in claim 1.
9. A composition comprising a mixture of:

| | Component | Percent by Weight |
| --- | --- | --- |
| (i) | polyethylene | 50 to 75 |
| (ii) | aluminum silicate | 10 to 20 |
| (iii) | sodium-potassium-aluminum silicate | 4 to 10 |
| (iv) | calcium metasilicate | 4 to 10 |
| (v) | one or more fatty acid amides | 2 to 5 |
| (vi) | a mixture of fatty acid mono-and diglycerides | 2 to 5 | wherein the weight ratio of monoglycerides to diglycerides is about 0.66:1 to about 99:1; of Al silicate of Na-K-Al silicate is about 2:1 to about 4:1; of Al silicate to Ca metasilicate is about 1:1 to about 4:1; and of Na-K-Al silicate to Ca metasilicate is about 0.5:1 to about 2:1.

* * * * *